(12) United States Patent
Newmaster

(10) Patent No.: US 12,461,179 B2
(45) Date of Patent: Nov. 4, 2025

(54) PROCESS AND METHOD FOR LABELLING PRODUCTS UTILIZING NMR ANALYSIS-CREATED SPECTRA INTENSITIES OF A PRODUCT TRANSLATED TO VISIBLE SPECTRUM

(71) Applicant: 2761134 ONTARIO INC., Guelph (CA)

(72) Inventor: Steven Newmaster, Guelph (CA)

(73) Assignee: 2761134 ONTARIO INC. (CA)

( * ) Notice: Subject to any disclaimer, the term of this patent is extended or adjusted under 35 U.S.C. 154(b) by 407 days.

(21) Appl. No.: 18/033,505

(22) PCT Filed: Oct. 27, 2021

(86) PCT No.: PCT/CA2021/051515
§ 371 (c)(1),
(2) Date: Apr. 24, 2023

(87) PCT Pub. No.: WO2022/087734
PCT Pub. Date: May 5, 2022

(65) Prior Publication Data
US 2023/0408613 A1 Dec. 21, 2023

Related U.S. Application Data

(60) Provisional application No. 63/106,332, filed on Oct. 27, 2020.

(51) Int. Cl.
*G01R 33/56* (2006.01)
*B42D 25/333* (2014.01)
(Continued)

(52) U.S. Cl.
CPC ....... *G01R 33/5608* (2013.01); *B42D 25/333* (2014.10); *G01N 24/08* (2013.01); *G01R 33/4625* (2013.01)

(58) Field of Classification Search
CPC ............ G01R 33/4625; G01R 33/5608; G01N 24/08; B42D 25/333
See application file for complete search history.

(56) References Cited

U.S. PATENT DOCUMENTS

| | | | |
|---|---|---|---|
| 7,874,496 B2 * | 1/2011 | Keam | G06K 19/06 235/494 |
| 9,285,444 B2 * | 3/2016 | Huber | G01N 24/08 |
| 11,454,611 B2 * | 9/2022 | Jones | G01N 30/7233 |

OTHER PUBLICATIONS

Dowlatabadi, et al. "Detection of Adulteration in Iranian Saffron Samples by H NMR Spectroscopy and Multivariate Data Analysis Techniques." Metabolomics: An Official Journal of the Metabolomics Society, vol. 13, No. 2, Feb. 2017, pp. 1-11. 12 pgs.

(Continued)

*Primary Examiner* — Gregory H Curran
(74) *Attorney, Agent, or Firm* — Taylor Duma LLP

(57) ABSTRACT

The process is for use with: a plurality of data sets including a data set for each of a plurality of variants of a product, each set including data about the variant for which the set is provided, the data about the variant for which the set is provided including details of at least portions of a spectra created by NMR analysis of the variant; and a predetermined arrangement of a predetermined number of cells. The process comprises defining a classification scheme. The scheme divides that part of an NMR spectrum which is present in the plurality of sets into a plurality of parts equal in number to the predetermined number of cells and assigns each of said parts to a unique cell of the predetermined arrangement; and defines a relationship between the range of NMR intensities found in the sets and a predetermined portion of the visible spectrum.

6 Claims, 7 Drawing Sheets

(51) Int. Cl.
*G01N 24/08* (2006.01)
*G01R 33/46* (2006.01)

(56) References Cited

OTHER PUBLICATIONS

Monakhova, et al. "Quantitative Analysis of Sunflower Lecithin Adulteration with Soy Species by NMR Spectroscopy and PLS Regression." The Journal of the American Oil Chemists' Society, vol. 93, No. 1, Jan. 2016, pp. 27-36. 10 pgs.

Newmaster, Steven; International Search Report and Written Opinion for PCT/CA2021/051515, filed Oct. 27, 2021, mailed Jan. 17, 2022, 6 pgs.

* cited by examiner

FIG. 2

PROCESS AND METHOD FOR LABELLING PRODUCTS UTILIZING NMR ANALYSIS-CREATED SPECTRA INTENSITIES OF A PRODUCT TRANSLATED TO VISIBLE SPECTRUM

CROSS-REFERENCE TO RELATED APPLICATIONS

This application claims the benefit of the filing date, cross-references pursuant to 35 U.S.C. 119(e) and incorporates by reference U.S. Provisional Patent Application Ser. 63/106,332, filed Oct. 27, 2020.

FIELD

The invention relates to the field of consumer goods labelling.

BACKGROUND

Many consumers of goods have a significant interest in understanding, in detail, the nature of the goods that they purchase or use, particularly if those goods are intended for ingestion or other forms of consumption.

SUMMARY OF THE INVENTION

Forming one aspect of the invention is a process for use with:
  a plurality of data sets, the plurality of data sets including a data set for each of a plurality of variants of a product, each data set including data about the variant for which the data set is provided, the data about the variant for which the data set is provided including details of at least portions of a spectra created by NMR analysis of the variant; and
  a predetermined arrangement of a predetermined number of cells,
  The process comprising the steps of:
  defining a classification scheme which
    divides that part of an NMR spectrum which is present in the plurality of data sets into a plurality of parts equal in number to the predetermined number of cells and assigns each of said parts to a unique cell of the predetermined arrangement; and
    defines a relationship between the range of NMR intensities found in the data sets and a predetermined portion of the visible spectrum.

Forming another aspect of the invention is a method for labelling a product, the method comprising the steps of:
  dividing a spectrum obtained from NMR analysis of the product into parts each equivalent to one of the plurality of parts; and
  coloring, in a unique impression of the predetermined arrangement associated with the product, the cells assigned to those parts, each cell being colored according to the relationship responsive to the intensity of the part of the NMR spectrum to which such cell is assigned.

According to another aspect, each cell is sized and colored to be visible to a human eye having normal visual acuity at a distance between about 6 to about 24 inches.

According to another aspect, the unique impression of the predetermined arrangement includes a watermark image which is formed of elements that differ spectrally from the predetermined portion of the visible spectrum and which are coincident with the cells.

According to yet another aspect, each cell can be colored according to the relationship responsive to the maximum intensity of the part of the NMR spectrum to which the cell is assigned.

A product labelled according to the method forms another aspect of the invention.

Advantages features and characteristics of the present invention will become apparent upon a review of the following detailed description with reference to the appended drawings, the latter being briefly described hereinafter.

BRIEF DESCRIPTION OF THE DRAWINGS

FIG. 2 is an example of a predetermined arrangement of a predetermined number of cells

DETAILED DESCRIPTION

Figure 1:
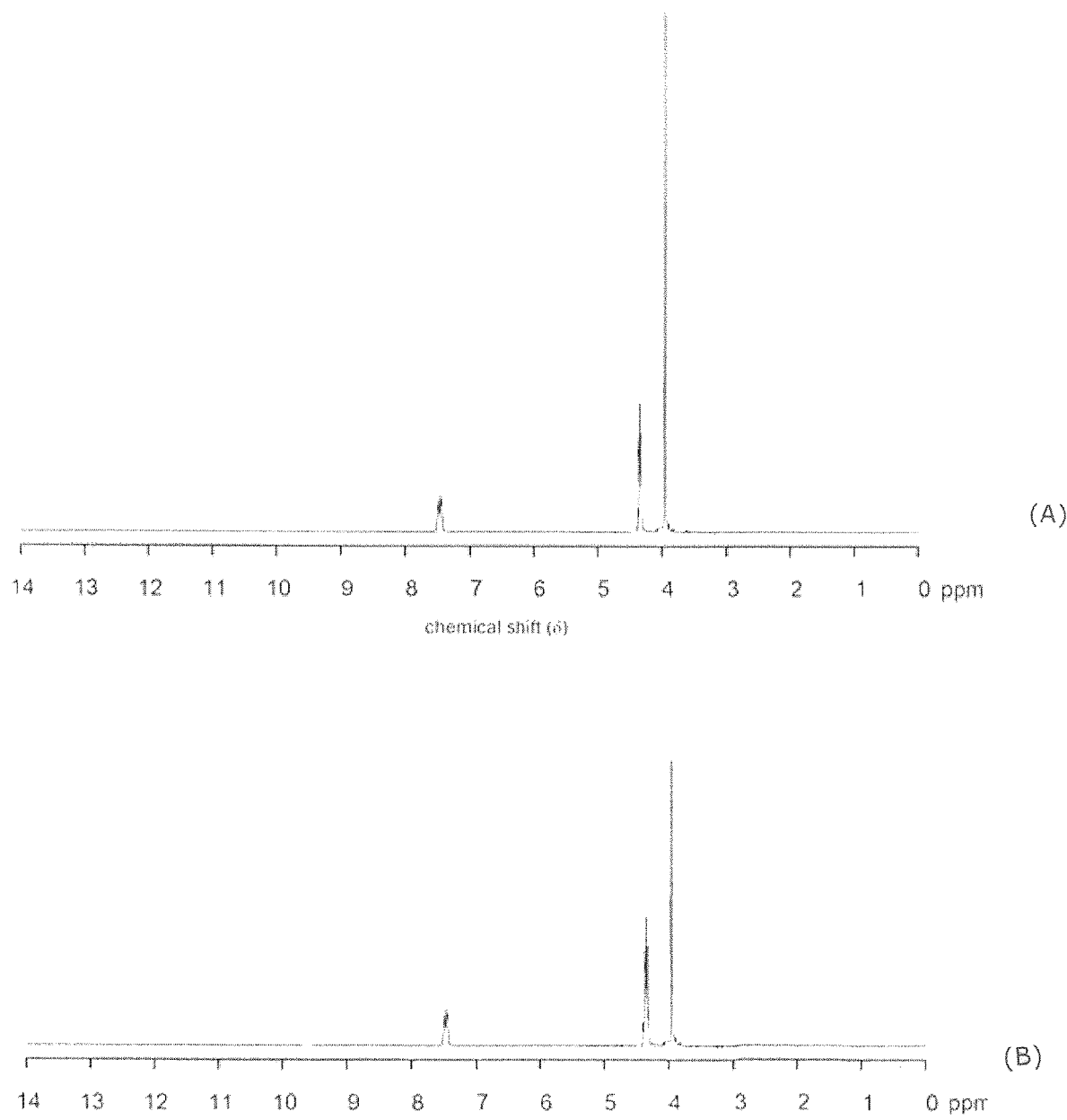
FIG. 1A is a view of a NMR spectra of a hypothetical first variant of a product.
FIG. 1B is a view of a NMR spectra of a hypothetical second variant of a product.
Figure 2:
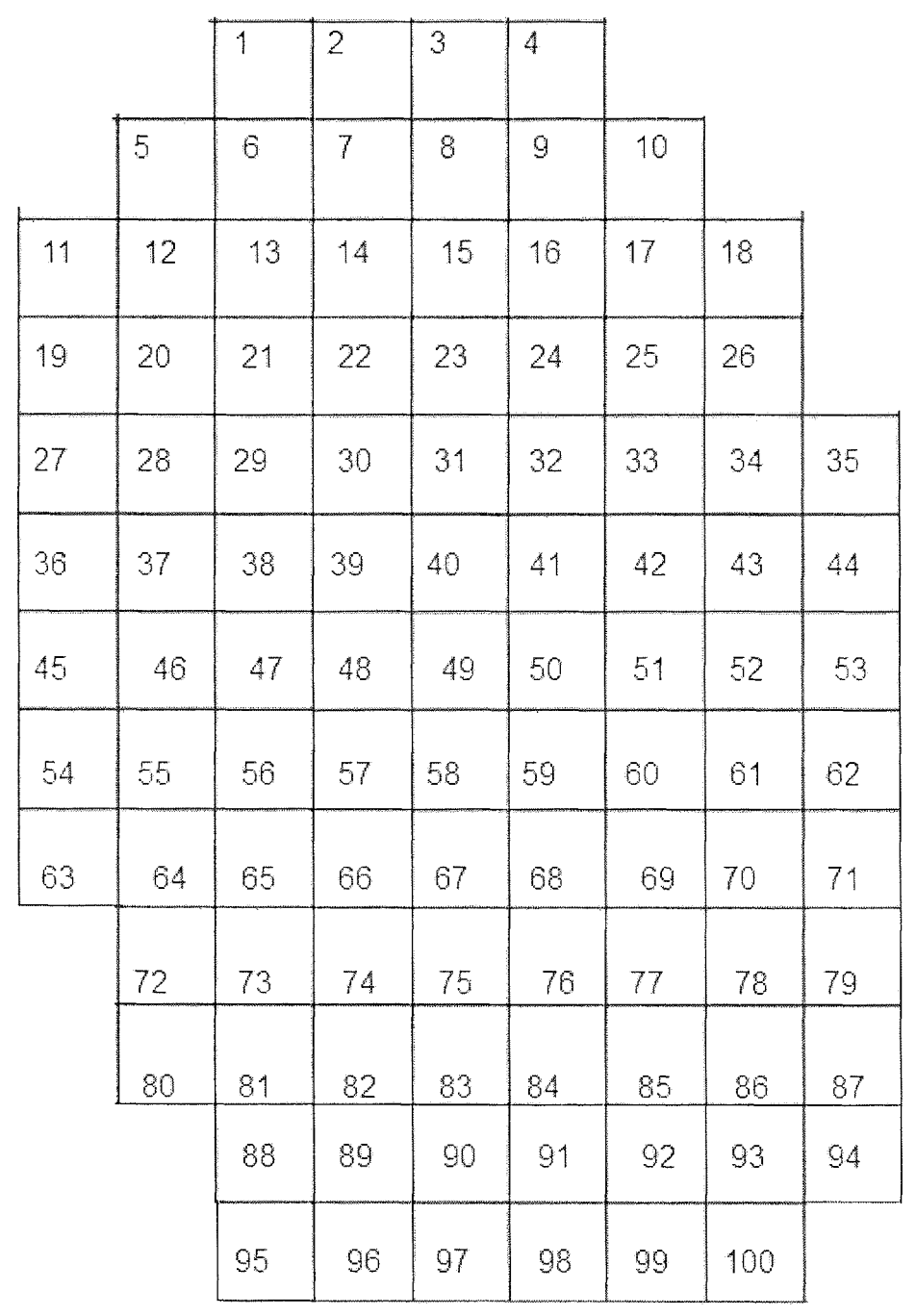

Reference will first be made to FIG. 1 and FIG. 2.

FIG. 1 shows a plurality of data sets (A) and (B), the plurality of data sets including a data set for each of a plurality of variants of a product, each data set including data about the variant for which the data set is provided, the data about the variant for which the data set is provided including details of at least portions of a spectra created by NMR analysis of the variant. The NMR spectra shown will be seen to be quite similar, each encompassing the range from 0 to 14 ppm and having spikes at about 39 ppm, 45 pm and 75 ppm, the sole difference between the spectra being that the spike at 39 ppm is higher in intensity in the upper variant (A) than in the lower variant (B).

FIG. 2 shows a predetermined arrangement of a predetermined number (100) of cells. The cells will be seen to be numbered sequentially.

Figure 3:
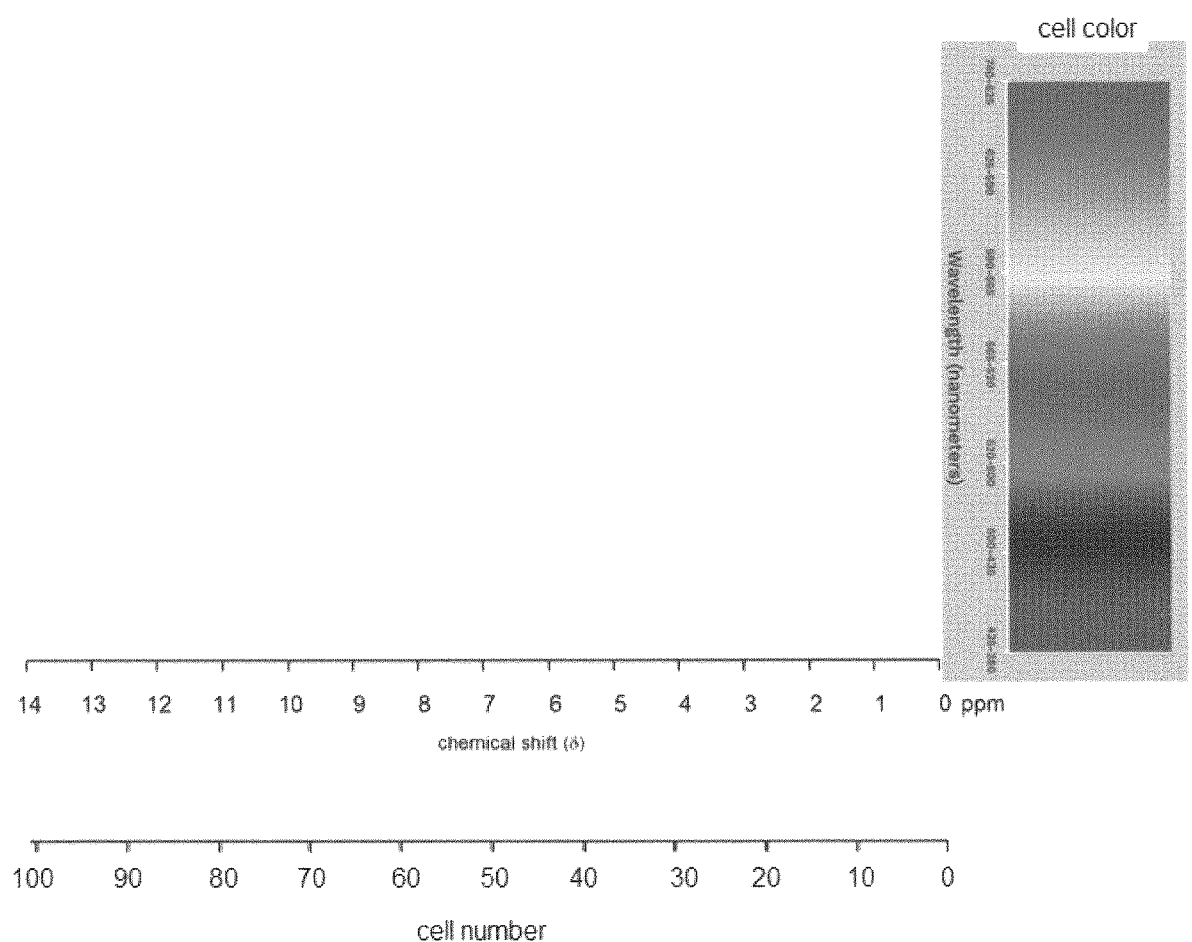
FIG. 3 shows a classification scheme

FIG. 3 shows a classification scheme which:
  divides that part of an NMR spectrum which is present in the plurality of data sets [i.e. 0 to 14 ppm] into a plurality of parts equal in number to the predetermined number of cells [i.e 100]
  assigns each of said 100 parts to a unique cell of the predetermined arrangement and
  defines a relationship between the range of NMR intensities found in the data sets and a predetermined portion of the visible spectrum.

For greater certainty, it should be understood that, for clarity, only, the cells are only indicated in groups of 10 in FIG. 3, but it will be appreciated that, for example, cell 28 would correspond to about 38.5-39.5 ppm, cell 32 would correspond to about 44.5 ppm-45.5 ppm and cell 54 would correspond to about 74.5 ppm to 75.5 ppm. Although the spectra of FIG. 1 are not shown in FIG. 3, it will be understood that the visible spectrum [380 nm to 740 nm]

defines the Y axis and is dimensioned to extend from the origin to a "height taller than the tallest of the spikes" of the collected spectra.

Figure 4:
FIG. 4 is an example of a watermark image

FIG. 4 shows a watermark image which in this example embodiment is used with the above classification system in a method for labelling product of the same general type as that represented by the spectra of FIG. 1. The watermark image will be seen to be formed of elements that differ spectrally from the predetermined portion of the visible spectrum, i.e. they are black.

Figure 5:
FIG. 5 shows the arrangement of FIG. 2 in use with the image of FIG. 4.

The method for labelling a product involves the use of the predetermined arrangement of FIG. 2 in combination with the watermark image of FIG. 4, arranged such that each cell is sized to be visible to a human eye having normal visual acuity at a distance between about 6 to about 24 inches and such that the elements of the watermark image are coincident with the cells of the arrangement, all as shown in FIG. 5, and comprises the steps of:

dividing a spectrum obtained from NMR analysis of the product into parts each equivalent to one of the plurality of parts [i.e. one of the 100 parts defined in the classification scheme]; and coloring, in a unique impression of the predetermined arrangement [unique to the product that is being labelled], the cells assigned to those parts, each cell being colored according to the aforementioned relationship responsive to the maximum intensity of the part of the NMR spectrum to which such cell is assigned.

Figure 6:
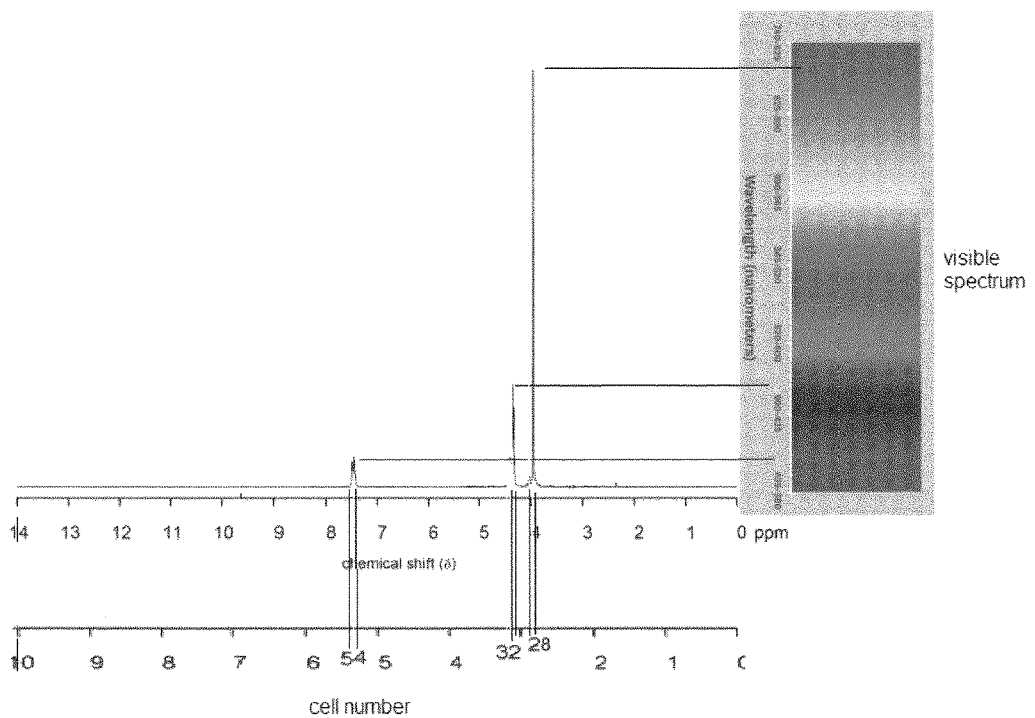
FIG. 6 shows the classification of FIG. 3 in use with the spectra of FIG. 1(A) and the image of FIG. 5.
Figure 6:
Figure 7:
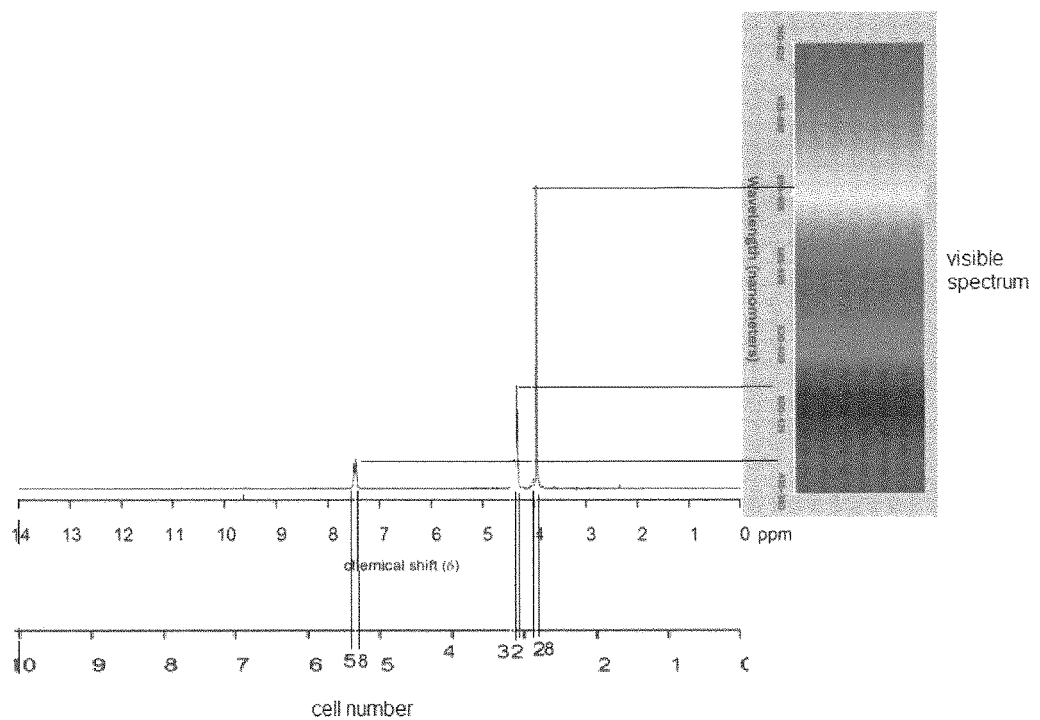
FIG. 7 shows the classification of FIG. 3 in use with the spectra of FIG. 1(B) and the image of FIG. 5.
Figure 7:

For further explanation in this regard, reference is made to FIG. 6 and FIG. 7, which shows the method applied to the spectra of FIG. 1(A) and FIG. 1(B), respectively.

More particularly, with reference to FIG. 6, it will be seen that the parts of the spectra that encompass the spikes of FIG. 1(A) are assigned to cells 28, 32 and 54 and the intensities of such spikes align with 625 nm, 500 nm and 450 nm. As such, cells 28, 32 and 54 are colored, red, blue and purple, respectively.

In FIG. 7, the spikes of course fall in the same ranges and are colored identically, but for that part of the spectrum which is assigned to cell 28 and which, in this example, has an intensity which corresponds to 580 nm . . . . As such, in the image created in FIG. 7, cell 28 is colored yellow.

It will be appreciated that the colored unique impression created pursuant to the method can be applied to the product in any conventional manner and, without limitation in this regard, will enable consumers to compare the chemical composition of labelled products with reference thereto.

The Cannabis Authenticity and Purity Standard (CAPS), a voluntary global certification program tailored specifically for the legalized cannabis industry, was published in early 2021. At its core is the utilization of NMR (Nuclear Magnetic Resonance) to validate the identity, purity and consistency of cannabis and hemp products. Prior to publication, industry stakeholders were introduced to the concept of the metabolomic fingerprint described herein. More particularly, the group was shown how the complex NMR spectral data that was collected could be graphically expressed as a thumb print and that variances and differences in spectra would be identifiable otherwise than by reviewing spectral data charts. There was consensus and acknowledgement that this would be of value and would provide end users with the transparent scientific data needed to provide safety and quality assurance, right at the point of purchase.

Variations are possible.

Whereas a watermark image resembling a fingerprint is shown herein, it will be appreciated that other images could be used. For example, if the product to be labelled was honey, the watermark image could be a honeycomb or a honey bee. If the image to be labelled was cannabis, the image could be a cannabis leaf or bud.

Whereas the arrangement herein shown is generally oval and numbers only 100 cells, it will be appreciated that this number was used only for purposes of illustration. It is contemplated that, for typical numbering purposes, an image of about 400 cells in an image size of about 4 square inches could be used to provide relatively granular information to a viewer having normal visual acuity; at this pixel size, the average viewer in normal light conditions could perceive the individual pixel color of a label held at arms length or less, thereby rending the method useful for consumer product labelling purposes.

Whereas in the example, the entirety of the arrangement was used to display NMR data, it will be appreciated that the cell:ppm ratio as shown in FIG. 3 is not limiting and cells in the arrangement could be reserved for other uses, such as harvest time, location, etc.

Similarly, whereas the entire useful range of chemical shift of a conventional NMR machine is mapped to the cells in the example embodiment, it will be appreciated that this is not strictly necessary. Without limitation in this regard, it will often be useful to omit from the mapping that portion of the spectra that is typically occupied by water or solvent. Similarly, some NMR machine may not be capable of capturing data over the entire 0 to 14 ppm range. It is contemplated that, if the method is used to label a product using an incomplete NMR dataset, the watermark image would be changed to gray tone in cells in respect of which data was not collected, thereby to ensure that the user did not perceive the absence of a color change in the watermark image as absence of a chemical spike.

Further, whereas in the example, the spectra is divided proportionally amongst the cells, it may in some cases be advantageous for the mapping to be non-linear, if the product that is the subject of the scheme is known to have chemistry of particular interest in particular portions of the chemical shift spectra.

Yet further, whereas in the example, each cell is indicated to be colored according to the maximum intensity of that portion of the spectra of the sample to which that cell is assigned, the color could be assigned based upon, for example, a mean intensity for the range. This could be of particular value if, for example, each cell was formed of sub-cells each of a size smaller than that which can be resolved by the average naked eye at or less than arms length: the sub-cells could be individually colored at nearby frequencies to provide greater information to those with suitable instrumentation, without modifying the color of the cell as seen by the naked eye.

Further, whereas in the example, the NMR spectra of the sample is associated to the cells without any cleaning, smoothing or regression, it will be appreciated that, for example, to the extent that a spike falls substantially within the range assigned to one visually perceptible cell but has a head or tail that slightly protrudes into a higher or lower value cell that is not adjacent in the image produced, the invention could be embodied in methods which permitted the omission of such shoulder data.

Accordingly, the invention should be understood to be limited only by the accompanying claims, purposively construed.

The invention claimed is:

1. A process for use with:
a plurality of data sets, the plurality of data sets including a data set for each of a plurality of variants of a product, each data set including data about the variant for which the data set is provided, the data about the variant for which the data set is provided including details of at least portions of a spectra created by NMR analysis of the variant; and
a predetermined arrangement of a predetermined number of cells,
the process comprising the steps of:
defining a classification scheme which
divides that part of an NMR spectrum which is present in the plurality of data sets into a plurality of parts equal in number to the predetermined number of cells and assigns each of said parts to a unique cell of the predetermined arrangement; and
defines a relationship between the range of NMR intensities found in the data sets and a predetermined portion of the visible spectrum.

2. A method for labelling a product comprising the steps of:
dividing a spectrum obtained from NMR analysis of the product into parts each equivalent to one of the plurality of parts of the process of claim 1;
coloring, in a unique impression of the predetermined arrangement of claim 1 associated with the product, the cells assigned to those parts pursuant to the process of claim 1, each cell being colored according to the relationship of claim 1 responsive to the intensity of the part of the NMR spectrum to which such cell is assigned.

3. A method according to claim 2, wherein each cell is sized and colored to be visible to a human eye having normal visual acuity at a distance between about 6 to about 24 inches.

4. A method according to claim 2, wherein the unique impression of the predetermined arrangement includes a watermark image which is formed of elements that differ spectrally from the predetermined portion of the visible spectrum and which are coincident with the cells.

5. A method according to claim 2, wherein each cell is colored according to the relationship responsive to the maximum intensity of the part of the NMR spectrum to which the cell is assigned.

6. A product labelled in accordance with the method of claim 2.

* * * * *